No. 733,537. PATENTED JULY 14, 1903.
H. BITNER.
MOP HEAD.
APPLICATION FILED JULY 1, 1902.
NO MODEL.
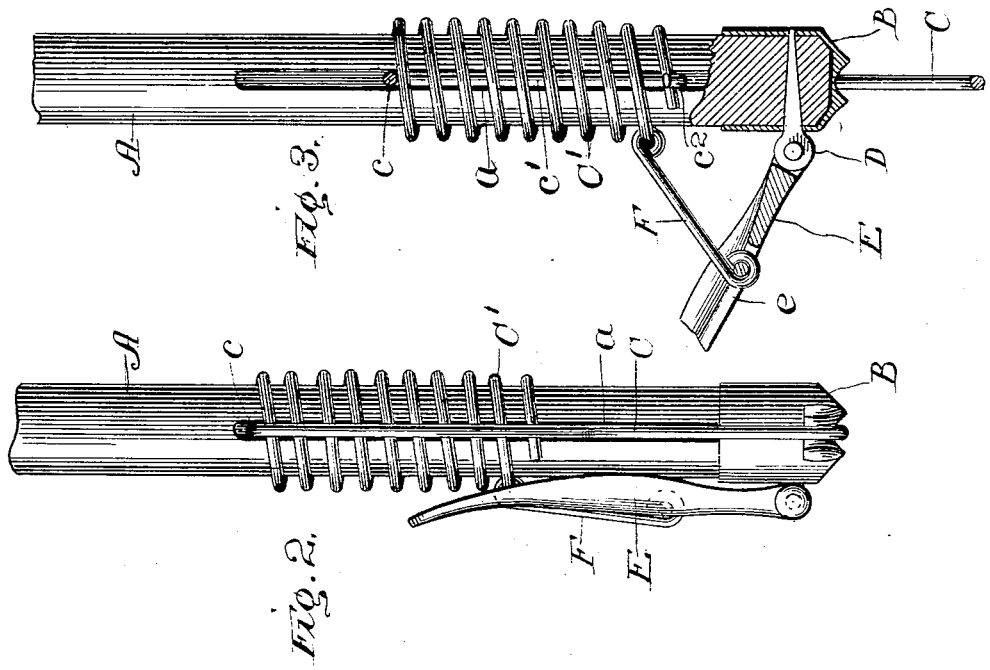
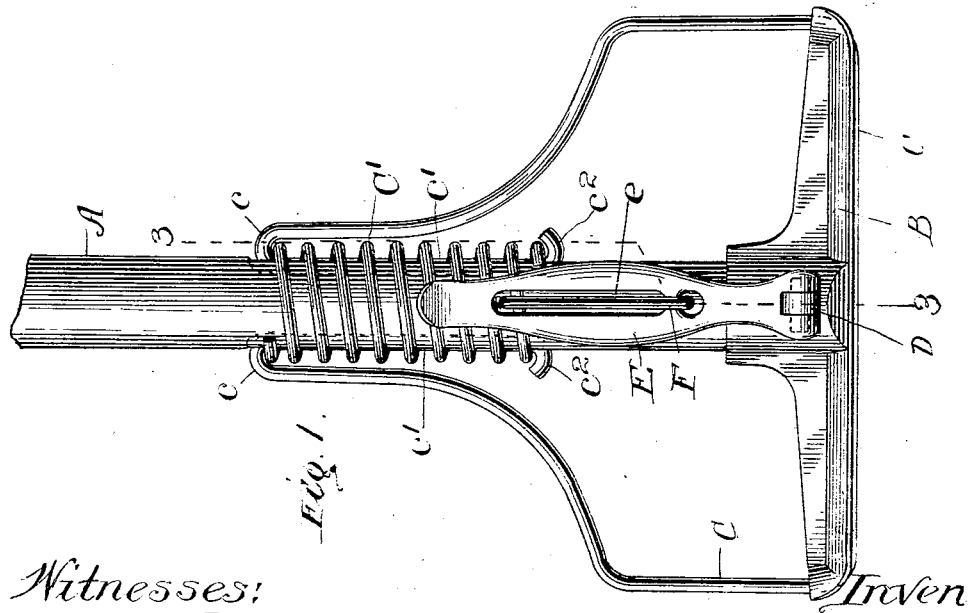
Witnesses:
Chas. O. Shurvey
Sylvia Bliss.
Inventor:
Harry Bitner No. 733,537.

Patented July 14, 1903.

UNITED STATES PATENT OFFICE.

HARRY BITNER, OF BERWYN, ILLINOIS, ASSIGNOR TO ARCADE MANUFACTURING COMPANY, OF FREEPORT, ILLINOIS, A CORPORATION OF ILLINOIS.

MOP-HEAD.

SPECIFICATION forming part of Letters Patent No. 733,537, dated July 14, 1903.

Application filed July 1, 1902. Serial No. 113,952. (No model.)

*To all whom it may concern:*

Be it known that I, HARRY BITNER, a citizen of the United States of America, residing at Berwyn, in the county of Cook and State of Illinois, have invented certain new and useful Improvements in Mop-Heads, of which the following is a specification.

My invention relates to certain new and useful improvements in mop-heads.

The object is to produce a device of this sort which shall accommodate itself readily to swabs of various sizes and hold them tightly at all times.

To this and other minor ends my invention consists in certain novel features of construction, which will be fully shown in the drawings and described in the specification.

In the drawings, Figure 1 is a front elevation of my mop-head. Fig. 2 is a side elevation of the same, and Fig. 3 is a longitudinal section in the line 3 3 of Fig. 1 and showing certain parts in a different position.

In the drawings, A is the supporting handle or stick of the mop-head, and it bears upon its lower end a cross-head B, grooved at the ends and on its lower side, as is usual.

C is the bail of the mop-head, and it lies in the groove of the cross-head B, extends upward from the cross-head, and after extending a short distance parallel to the handle A it converges toward said handle, as is clearly shown in Fig. 1. The bail then recurves at $c$, forming two straight portions $c'$, these portions lying in grooves $a$ in the handle. The straight portions $c'$ terminate in outwardly-extending hooks $c^2$. A coiled spring C', preferably under tension, encircles the handle A and extends between the curves $c$ and $c^2$ of the bail.

A bracket D is secured in the handle near the cross-head, and to this bracket is pivoted a lever E. Running from this lever, preferably from a point near its middle, is a link F, encircling one of the turns of the spring C' and pivoted to it.

The operation of the mop-head is substantially as follows: When it is desired to open the mop-head, the lever is thrown toward the cross-head into the position shown in Fig. 3, the spring pulling upon the hooks $c^2$ of the bail and forcibly drawing it away from the cross-head, as shown in Fig. 3. The swab is then placed in position and the lever is thrown away from the cross-head. The link then pushes upon the spring, forcing it and the bail C up the stick. A slot $e$ is provided in the lever, which permits the link to pass through the lever, the point of connection of the links with the lever thereby passing the line between the fulcrum of the lever and the point of connection of the link F with the spring C'. This of course locks the lever in place and keeps the spring under compression.

It will be seen that a spring-pressure is maintained between the cross-head and the bail, which permits the mop-head to take any sized swab and keep an even and continuous pressure upon the same. It will also be noticed that when the lever E is unlocked the spring expands until it is confined between the hooks $c$ $c^2$, which limits said expansion and permits the bail to be drawn far enough away from the cross-head to permit a thick swab to be used.

I realize that considerable changes can be made in the details of this construction, and I do not, therefore, desire to limit myself to the specific form herein shown.

I claim as new and desire to secure by Letters Patent—

1. In a device of the class described, the combination with a handle and cross-head, of a bail running over said cross-head, said bail being recurved toward said cross-head and having hooks upon its lower end, of a spring confined between the hook of said bail and the point where it is recurved, and means for separating the lower end of said spring from said cross-head, substantially as described.

2. In a device of the class described, the combination with a handle and cross-head, of a bail running over said cross-head, a spring between the upper end of said bail and said cross-head, a bracket extending laterally from said handle near said cross-head, a lever pivoted to said bracket, and a link running from a point near the middle of said lever to one of the turns of said spring, substantially as described.

3. In a device of the class described, the combination with a handle and cross-head, a bail running over said cross-head, a spring between the upper end of said bail and said cross-head, a laterally-extending bracket secured to said handle near said cross-head, a lever provided with a suitable perforation pivoted upon said bracket, and a link pivoted in said lever near its middle and running to the lower end of said spring, whereby when said lever is thrown toward said stick, said link may pass through said perforation, thereby locking said lever against said handle, substantially as described.

In witness whereof I have hereunto set my hand, at Chicago, in the county of Cook and State of Illinois, this 27th day of June, A. D. 1902.

HARRY BITNER.

Witnesses:
CHARLES O. SHERVEY,
S. BLISS.